United States Patent [19]

Eriksson

[11] Patent Number: 4,632,084
[45] Date of Patent: Dec. 30, 1986

[54] VALVE FOR APPORTIONING PREHEATED AND NON-PREHEATED AIR TO AN INTERNAL COMBUSTION ENGINE

[75] Inventor: Sivert Eriksson, Partille, Sweden
[73] Assignee: AB Volvo, Gothenburg, Sweden
[21] Appl. No.: 741,822
[22] Filed: Jun. 6, 1985
[51] Int. Cl.⁴ ............................................. F02M 31/00
[52] U.S. Cl. ...................................... 123/556; 123/552
[58] Field of Search ................................ 123/552, 556; 236/101 C; 236/86, 101 E, 87

[56] References Cited

U.S. PATENT DOCUMENTS

| | | | |
|---|---|---|---|
| 1,431,224 | 10/1922 | Graef | 123/552 |
| 2,101,627 | 12/1937 | Nallinger | 123/556 |
| 2,380,374 | 7/1945 | Anderson | 123/552 |
| 2,429,208 | 10/1942 | Matthews | 123/556 |
| 2,557,717 | 6/1951 | Anthony | 123/556 |
| 3,982,517 | 9/1976 | Fales | 123/556 |
| 4,194,476 | 3/1980 | Lombardi | 123/552 |
| 4,205,646 | 6/1980 | Ikari | 123/552 |
| 4,501,254 | 2/1985 | Zellmer | 123/552 |
| 4,526,156 | 7/1985 | Briche | 123/556 |

FOREIGN PATENT DOCUMENTS

| | | |
|---|---|---|
| 2732165 | 1/1978 | Fed. Rep. of Germany . |
| 347791 | 8/1972 | Sweden . |
| 352698 | 1/1973 | Sweden . |
| 357030 | 6/1973 | Sweden . |
| 357237 | 6/1973 | Sweden . |

*Primary Examiner*—Ronald H. Lazarus
*Attorney, Agent, or Firm*—Young & Thompson

[57] ABSTRACT

The invention relates to a valve for apportioning preheated and non-preheated air to an internal combustion engine. The valve has a pivotally mounted valve flap, which is rigidly joined to a balance flap which is so constructed and arranged in the valve body that the low pressure created by the airflow through the valve body gives rise to oppositely directed torques of substantially the same magnitude about the pivot shaft on the balance flap and the valve flap.

4 Claims, 2 Drawing Figures

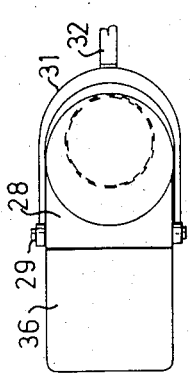
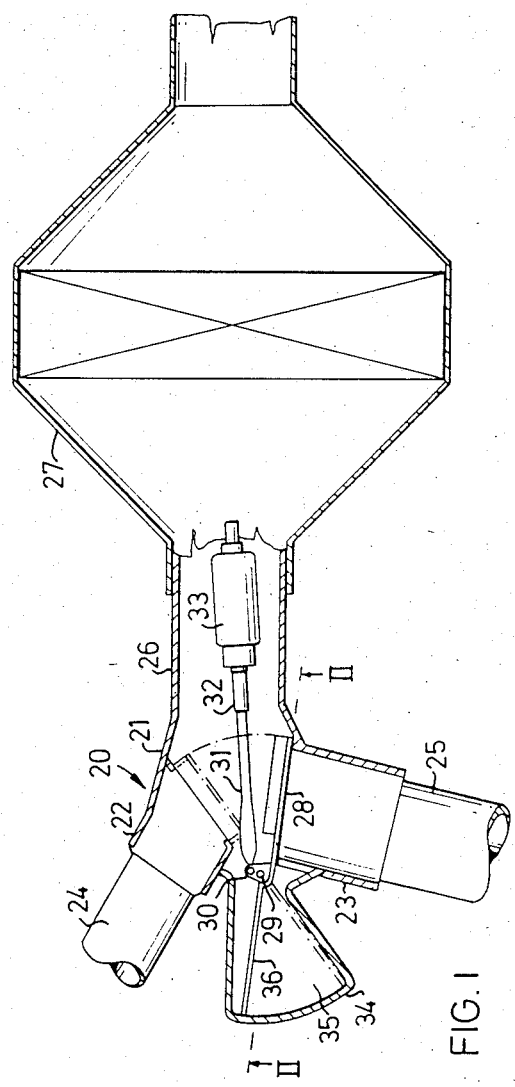

VALVE FOR APPORTIONING PREHEATED AND NON-PREHEATED AIR TO AN INTERNAL COMBUSTION ENGINE

The present invention relates to a valve for apportioning preheated and non-preheated intake air to an internal combustion engine, comprising a valve body with an inlet for preheated air, an inlet for non-preheated air, an outlet leading to an intake conduit and a thermostatically controlled, pivotally mounted, valve flap which can be set in various positions to vary the mixing ratio between preheated and non-preheated air to the outlet.

In known valves of this type, a valve flap is usually journalled along one lateral edge, which means that when the flap closes one or the other intake, it will be subjected to a torque which strives to pivot the flap in the direction for opening. This is because one side of the flap is subjected to atmospheric pressure and the other side is subjected to a subatmospheric pressure which arises as a result of the airflow from the open inlet to the outlet. Due to the fact that the airflow to the engine is pulsating, the resulting force acting on the flap will also pulsate. The force exerted by the thermostat on the flap in either closing direction is dependent on the temperature in the intake conduit. As a result thereof the flap at certain temperatures and low pressures (engine loads) will alternately swing away from and towards its valve seat at the inlet, due to the fact that the pulsating torque acting in the opening direction will alternately exceed and fall short of the torque acting in the closing direction. The result will be an unpleasant noise from the valve. At full load the torque caused by the low pressure can overcome the torque in the opposite direction, so that the engine receives an incorrect mixture of preheated and non-preheated air.

Attempts have been made previously to solve the problem of noise with the aid of a foam rubber-coated flap or by providing the flap with a hydraulic dampener. Both of these solutions have disadvantages. In the first case, one does not obtain 100% noise elimination. In the second case, the design is expensive and complicated. Neither of these solutions can prevent the flap from being sucked away from its seat during full load engine operation.

The purpose of the present invention is to achieve a valve of the type described in the introduction, which removes all of the above-mentioned disadvantages.

This is achieved according to the invention by the flap being made with surface portions located on either side of its pivot axis, said portions being of such dimensions and being so arranged that forces exerted on the flap as a result of the airflow through the valve body give rise to oppositely directed torques of substantially the same magnitude.

Instead of attempting to dampen the torque created by the pulsating low pressure by using the inertia of a hydraulic dampening means for example, the invention is based on the idea of generating a correspondingly pulsating equally large counter-torque on the flap.

In a preferred embodiment of the valve according to the invention, the flap forms on the one hand a sealing element, by means of which the inlets are alternately closable and at the lateral edge of which the pivot axis is located, and on the other hand a balance element, which is a continuation of the sealing element on the opposite side of the pivot axis and extends into a chamber, which communicates on one side of the balance element with one of the inlets and on the other side with the other inlet.

The advantage of this embodiment is that it provides great freedom of adaption to existing engine intake installations. The design thus makes it possible to replace an existing valve of older design with a valve according to the invention without requiring any additional modifications, due to the fact that the latter can have exactly the same design as the former with regard to the placement of the inlets and outlets, the shape of the closing elements and the placement of the pivot axis. The only external differences is that the valve according to the invention has an extension of the chamber defined by the valve body.

The invention will be described in more detail with reference to examples shown in the accompanying drawings, of which FIG. 1 shows a longitudinal section through a valve according to the invention in a preferred practical embodiment, and FIG. 2 a view along the line.

FIG. 1 shows a valve 20 according to the invention, which is a development of a known, practical valve design. The valve comprises a valve body 21 with inlet fittings 22 and 23 connected to inlet pipes 24 and 25 for preheated and non-preheated air, respectively, and an outlet pipe 26, to which an air filter 27 is connected. A valve flap 28 is mounted in the body to pivot about a pivot shaft 29. The flap 28 is rigidly connected to a pair of short levers 30 to which there is pivotally connected a U-shaped fork 31 with a connecting operating rod 32. A thermostat 33 is arranged in the outlet 26. The operating member of the thermostat is joined via counteracting springs to the operating rod 32. Thus far the design agrees with the known design.

The new and characteristic feature of the valve 20 is that the body 21 is made with a projecting body portion 34, which defines a chamber 35 in the shape of a circular sector, in the longitudinal section shown, and which contains a balance flap 36, rigidly joined to the flap 28. The chamber 35 is divided by the balance flap 36 into two portions, one of which freely communicates with one inlet pipe 24, the other communicating with the other inlet pipe 25. The low pressure in the valve body will thus give rise to forces on the balance flap, producing a counter-torque to the torque produced by the forces on the valve flap. The surface of the balance flap is adapted to the surface of the valve flap so that these oppositely directed torques cancel each other out.

The body 21 with the body portion 34 are suitably manufactured as a single unit of injection moulded plastic, to which the existing pipes can be connected directly when replacing an older valve with a valve according to the invention.

The embodiment described above has a purely mechanical thermostatic control. Electronic thermostatic control can also be used, which if needed can also take into consideration additional parameters such as humidity and atmospheric pressure together with temperature.

I claim:

1. Valve for apportioning preheated and non-preheated air to an internal combustion engine, comprising a valve body having an inlet for preheated air, an inlet for non-preheated air, a common outlet from the valve leading to an intake conduit for the engine, and a thermostatically controlled flap valve mounted for pivotal movement about an axis that passes through the valve body, between extreme end positions in one of which a first flap portion on one side of said axis closes said inlet for preheated air and in the other extreme end position of which said first flap portion closes said inlet for non-preheated air, said valve flap having a second flap portion on the side of said axis opposite said first flap portion, said valve body having a balancing chamber which communicates on both sides of said axis with the portion of the interior of the valve body in which said first flap portion moves, said second flap portion being disposed in said balancing chamber and dividing said balancing chamber into two portions separated from each other by said second flap portion, said flap portions being of such dimensions and being so arranged that the forces exerted on the flap valve as a result of the air flow through the valve body give rise to oppositely directed torques of substantially the same magnitude.

2. A valve according to claim 1, in which said balancing chamber has in longitudinal section substantially the shape of a circular sector.

3. A valve according to claim 1, in which the valve body is an injection-molded plastic body which has connecting fittings for the outlet and for the inlets for preheated and for non-preheated air.

4. A valve according to claim 1, and a thermostat unit in the valve body outlet, said unit having an operating rod which is connected by a U-shaped fork to short levers carried by the flap valve.

* * * * *